US008029364B2

(12) United States Patent
Loose et al.

(10) Patent No.: US 8,029,364 B2
(45) Date of Patent: Oct. 4, 2011

(54) SYSTEM, METHOD, AND APPARATUS FOR PRESENTING MEDIA IN A WAGERING GAME MACHINE

(75) Inventors: Timothy C. Loose, Chicago, IL (US); Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 998 days.

(21) Appl. No.: 11/178,650

(22) Filed: Jul. 11, 2005

(65) Prior Publication Data

US 2006/0019747 A1 Jan. 26, 2006

Related U.S. Application Data

(60) Provisional application No. 60/640,814, filed on Dec. 30, 2004, provisional application No. 60/590,681, filed on Jul. 23, 2004.

(51) Int. Cl.
*A63F 13/00* (2006.01)
*A63F 1/00* (2006.01)

(52) U.S. Cl. ................ 463/42; 463/29; 463/31; 463/34; 463/35; 463/40; 273/138.1

(58) Field of Classification Search .................... 463/29, 463/31, 34, 35, 40, 42; 273/138.1
See application file for complete search history.

(56) References Cited

U.S. PATENT DOCUMENTS

| | | | | |
|---|---|---|---|---|
| 7,025,674 | B2 | 4/2006 | Adams et al. | |
| 2003/0054881 | A1 * | 3/2003 | Hedrick et al. | 463/29 |
| 2004/0142739 | A1 | 7/2004 | Loose et al. | |
| 2005/0020358 | A1 * | 1/2005 | Cram | 463/31 |
| 2006/0143085 | A1 | 6/2006 | Adams et al. | |
| 2007/0105613 | A1 | 5/2007 | Adams et al. | |
| 2007/0111787 | A1 | 5/2007 | Adams et al. | |

FOREIGN PATENT DOCUMENTS

| | | | |
|---|---|---|---|
| WO | WO-2006019657 | A2 | 2/2006 |
| WO | WO-2006019657 | A3 | 2/2006 |
| WO | WO-2006019657 | C1 | 2/2006 |

* cited by examiner

*Primary Examiner* — Peter DungBa Vo
*Assistant Examiner* — Jeffrey Wong
(74) *Attorney, Agent, or Firm* — Schwegman, Lundberg & Woessner, P.A.

(57) ABSTRACT

System, methods and apparatus for presenting media in a wagering game machine are described herein. In one embodiment, the method includes receiving an internal media request from a component of the wagering game machine and receiving an external data signal from outside the wagering game machine. In the embodiment, the method also includes preparing media based on the internal media request and the external data signal and presenting the media on media presentation devices.

17 Claims, 12 Drawing Sheets

300
302
302
312
312
310
302
308
308
302
302

600
BEGIN
RECEIVE AN INTERNAL MEDIA REQUEST.
602
RECEIVE AN EXTERNAL DATA SIGNAL.
604
BASED ON THE INTERNAL REQUEST AND/OR EXTERNAL SIGNAL, PREPARE MEDIA.
606
PRIORITIZE MEDIA, IF NECESSARY.
608
PRESENT MEDIA.
610
YES
MORE REQUESTS/ SIGNALS?
612
NO
END

SYSTEM, METHOD, AND APPARATUS FOR PRESENTING MEDIA IN A WAGERING GAME MACHINE

RELATED APPLICATIONS

This application claims the priority benefit of U.S. Provisional Application Ser. No. 60/590,681, filed Jul. 23, 2004, and of U.S. Provisional Application Ser. No. 60/640,814, filed Dec. 30, 2004, the contents of which are incorporated herein by reference.

BACKGROUND

Field

This invention relates generally to the field of wagering game machines and more particularly to the field of presenting media on wagering game machines.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any software and data as described below and in the drawings that form a part of this document: Copyright 2005, WMS Gaming, Inc. All Rights Reserved.

DESCRIPTION OF RELATED ART

A wide variety of computerized wagering game machines are now available to gamers and casino operators. Computerized wagering game machines range from slot machines to games that are traditionally played live, such as poker, blackjack, roulette, etc. These computerized games provide many benefits to game owners and gamblers, including increased reliability over mechanical machines, greater game variety, improved sound and animation, and lower overall production and management cost.

Computerized wagering game machines must be designed with many of the same concerns as their mechanical and table game ancestors—they must be fair, they should provide sufficient feedback to make the games fun, and they must meet a variety of gaming regulations to ensure that both the machine owner and gamer are fairly treated. Further, to ensure success in a competitive gaming market, they should provide gaming experiences that are at least as attractive as those of older mechanical gaming machines.

Many computerized wagering game machines can work with other wagering game machines in a variety of ways, such as by clustering the machines together in competition for a single progressive jackpot. The progressive jackpot is typically larger than any single machine jackpot, and the progressive jackpot typically grows as more value is wagered on machines in the progressive jackpot cluster. Additionally, computerized wagering game machines can work with player tracking systems and player messaging systems. For example, a player tracking system can track the player's time on device, amount wagered, and play frequency. Additionally, the player tracking system can relay messages to the player's machine.

Because wagering game machines typically work with other wagering game machines and systems (e.g., player tracking and messaging systems), there is a need for communication between the various machines/systems. For example, a casino messaging system may need to communicate information to players who are using wagering game machines. Establishing communications between the machines and systems can be difficult, especially in environments where wagering game machines and systems do not conform to the same communication protocols (e.g., because they are from different manufactures). The communication is further complicated because the machines do not utilize the same electrical hardware, microprocessors, software or video displays. Reconfiguring machines and systems to conform to communication protocols and hardware platforms can be extremely time consuming and expensive. Deployment of an interface system that does not require modifications to the wagering game software would simplify player tracking and messaging systems and avoid regulatory resubmissions.

SUMMARY

System, methods and apparatus for presenting media in a wagering game machine are described herein. In one embodiment, the method includes receiving an internal media request from a component of the wagering game machine and receiving an external data signal from outside the wagering game machine. In the embodiment, the method also includes preparing media based on the internal media request and the external data signal and presenting the media on media presentation devices.

In one embodiment, the system includes a gaming module to conduct a wagering game and to select a first media content. In the embodiment, the system also includes an external signal receiver to receive a second media content from a source outside the wagering game machine. In the embodiment, the system also includes a media switcher to receive the first media content and the second media content, the media switcher to present the first media content and a second media content on one or more media presentation devices.

In one embodiment, the apparatus includes means for receiving value and means for conducting a wagering game based on the value, the means for conducting a wagering game to transmit an internal media request, wherein the internal media request includes a first media content to represent a state of the wagering game. In the embodiment, the apparatus also includes means for receiving an external data signal from outside the apparatus, the external data signal including control data or a second media content, wherein the control data includes instructions to present local media content stored on the apparatus. In the embodiment, the apparatus also includes means for presenting the first media content, second media content, and local media content on a media presentation device.

In one embodiment, a computerized wagering game system has a gaming module comprising a processor and gaming code which is operable when executed on the processor to conduct a wagering game on which monetary value can be wagered, and a display coupled to the gaming module and operable to display information related to the wagering game. A video switcher is coupled between the video display and the gaming module, and is operable to receive an external video signal from a video source external to the wagering game system. The video switcher is further operable to control presentation of the external video signal and the wagering game information on the display.

BRIEF DESCRIPTION OF THE FIGURES

The present invention is illustrated by way of example and not limited to the Figures of the accompanying drawings in which.

DESCRIPTION OF THE EMBODIMENTS

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

A system, method, and apparatus for presenting media in a wagering game machine are described herein. This description of the embodiments is divided into five sections. This description of the embodiments is also divided into five sections. The first section describes an overview, while the second section describes an exemplary operating environment and system architecture. The third section describes exemplary operations and the fourth section describes an exemplary implementation. The fifth section provides some general comments.

Overview

This section provides a broad overview of a system for presenting media in a wagering game machine. In particular, this section describes using a media switcher to present media in a wagering game machine, according to exemplary embodiments of the invention.

Figure 1:
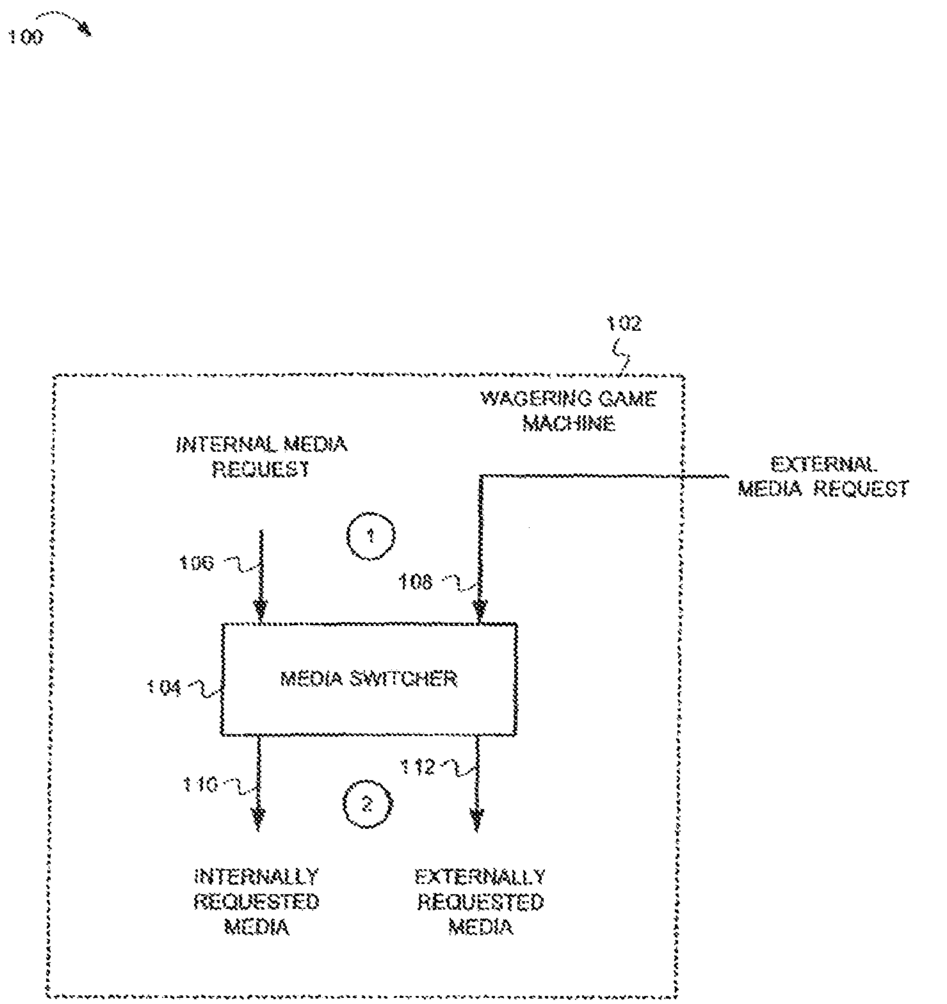
FIG. 1 is a dataflow diagram illustrating data flow related to using a media switcher for presenting media in a wagering game machine, according to embodiments of the invention.

FIG. 1 is a dataflow diagram illustrating data flow related to using a media switcher for presenting media in a wagering game machine, according to exemplary embodiments of the invention. As shown in FIG. 1, a wagering game machine 102 includes a media switcher 104 for presenting media in a wagering game. The media switcher 104 can include hardware, software, and/or other logic for presenting media, as described below.

The data flow of FIG. 1 is divided into two stages. During stage 1, the media switcher 104 receives an internal media request 106 and an external media request 108. The media switcher 104 receives the internal media request 106 from a component (not shown) inside the wagering game machine 102, whereas it receives the external media request 108 from outside the wagering game machine 102.

The media requests 106 and 108 can include data, audio signals, video signals, or other signals which the media switcher 104 can present on the wagering game machine's media presentation devices (not shown). Alternatively, data included in the requests 106 and 108 can prompt the media switcher 104 to present one or more predetermined media sequences, where the predetermined media sequences are stored on the gaming machine 102.

At stage two, the media switcher 104 presents internally requested media 110 and externally requested media 112. The internally requested media 110 is based on the internal media request 106, while the externally requested media 112 is based on the external media request 108. The presentations 110 and 112 can include renderings of audio and/or video signals included in the requests 106 and 108. Alternatively, the presentations can include locally stored predetermined media content, such as locally stored prerecorded movie clips, preprogrammed animation sequences, prerecorded music, etc.

As shown in FIG. 1, the media switcher 104 can receive the requests 106 and 108 in parallel, and it can also perform the media presentations 110 and 112 in parallel. While this overview describes operations performed by certain embodiments of the invention, other embodiments perform additional operations, as described in greater detail below.

Hardware, Operating Environment, and System Architecture

This section provides an overview of some exemplary hardware and an operating environment in which embodiments of the invention can be practiced. This section also describes an exemplary system architecture for presenting media in a wagering game machine. Operations of the system components will be described in the next section.

Exemplary Hardware and Operating Environment

The wagering game machines described below can employ any of the media presentation techniques described herein. Before discussing details related to presenting media in a wagering game machine, this section will describe some general features of wagering game machines.

Figure 2:
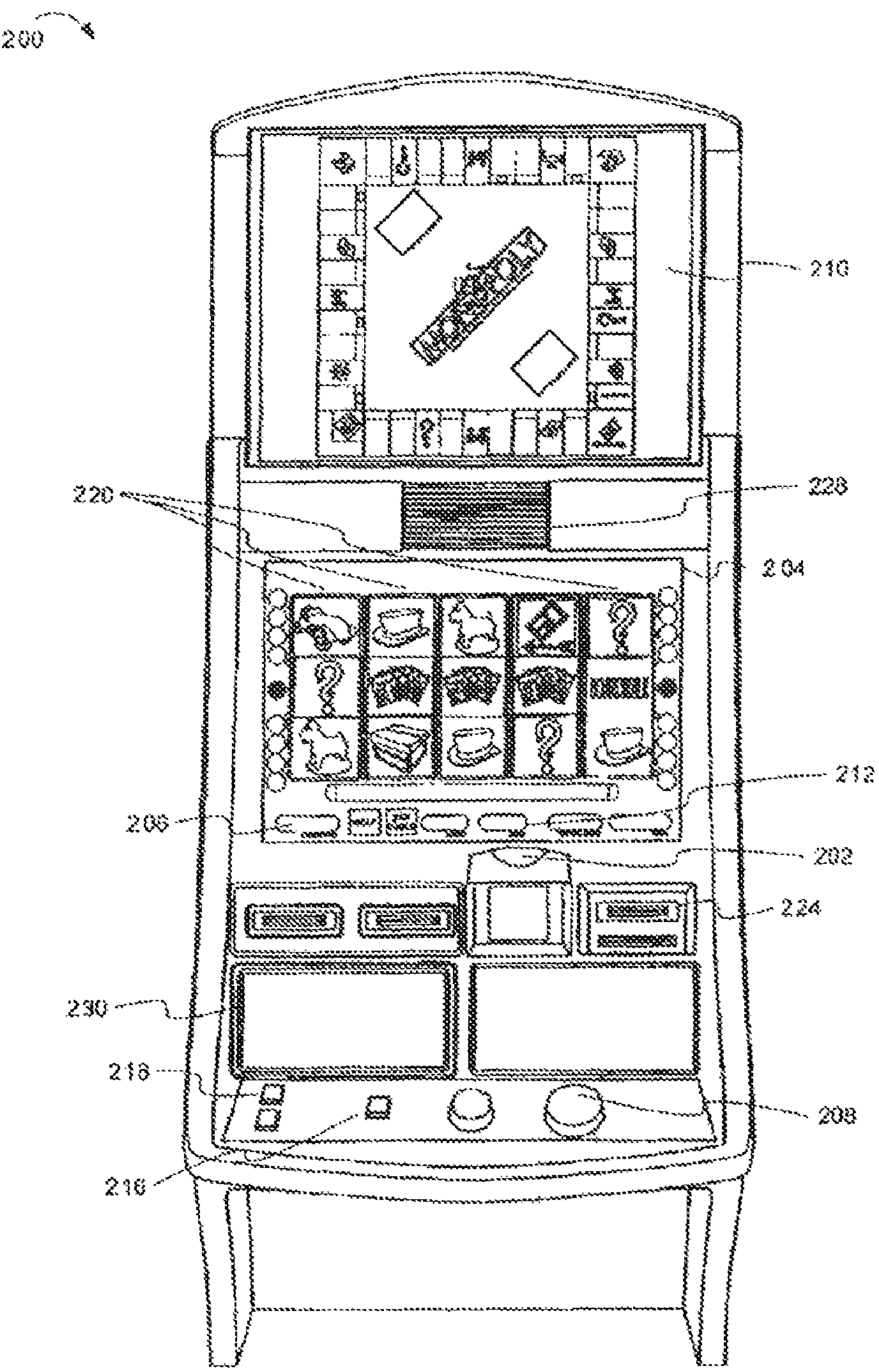
FIG. 2 is a perspective view of a wagering game machine, according to exemplary embodiments of the invention.

FIG. 2 is a perspective view of a wagering game machine, according to exemplary embodiments of the invention. As shown in FIG. 2, the wagering game machine 200 can be a computerized slot machine having the controls, displays, and features of a conventional slot machine.

The wagering game machine 200 can be operated while players are standing or seated. Additionally, the wagering game machine 200 is preferably mounted on a stand (not shown). However, it should be appreciated that the wagering game machine 200 can be constructed as a pub-style tabletop game (not shown), which a player can operate while sitting. Furthermore, the wagering game machine 200 can be constructed with varying cabinet and display designs. The wagering game machine 200 can incorporate any primary game such as slots, poker, or keno, and additional bonus round games. The symbols and indicia used on and in the wagering game machine 200 can take mechanical, electrical, or video form.

As illustrated in FIG. 2, the wagering game machine 200 includes a coin slot 202 and bill acceptor 224. Players can place coins in the coin slot 202 and paper money or ticket vouchers in the bill acceptor 224. Other devices can be used for accepting payment. For example, credit/debit card readers/validators can be used for accepting payment. Additionally, the wagering game machine 200 can perform electronic funds transfers and financial transfers to procure monies from financial accounts. When a player inserts money in the wagering game machine 200, a number of credits corresponding to the amount deposited are shown in a credit display 206. After depositing the appropriate amount of money, a player can begin playing the game by pushing play button 208. The play button 208 can be any play activator used for starting a wagering game or sequence of events in the wagering game machine 200.

As shown in FIG. 2, the wagering game machine 200 also includes a bet display 212 and a "bet one" button 216. The player places a bet by pushing the bet one button 216. The player can increase the bet by one credit each time the player pushes the bet one button 216. When the player pushes the bet one button 216, the number of credits shown in the credit display 206 decreases by one credit, while the number of credits shown in the bet display 212 increases by one credit.

A player may "cash out" by pressing a cash out button 218. When a player cashes out, the wagering game machine 200 dispenses a voucher or currency corresponding to the number of remaining credits. The wagering game machine 200 may employ other payout mechanisms such as credit slips (which are redeemable by a cashier) or electronically recordable cards (which track player credits), or electronic funds transfer.

The wagering game machine also includes a primary display unit 204 and a secondary display unit 210 (also known as a "top box"). The wagering game machine may also include an auxiliary video display 230. In one embodiment, the primary display unit 204 displays a plurality of video reels 220. According to embodiments of the invention, the display units 204 and 210 can include any visual representation or exhibition, including moving physical objects (e.g., mechanical reels and wheels), dynamic lighting, and video images. In one embodiment, each reel 220 includes a plurality of symbols such as bells, hearts, fruits, numbers, letters, bars or other images, which correspond to a theme associated with the wagering game machine 200. Furthermore, as shown in FIG. 2, the wagering game machine 200 includes a audio presentation unit 228. The audio presentation unit 228 can include audio speakers or other suitable sound projection devices.

In one embodiment, a plurality of wagering game machines can be connected together with other gaming systems to form a gaming network. In one embodiment, the wagering game machine presents media based on data signals received from other network nodes.

Figure 3:
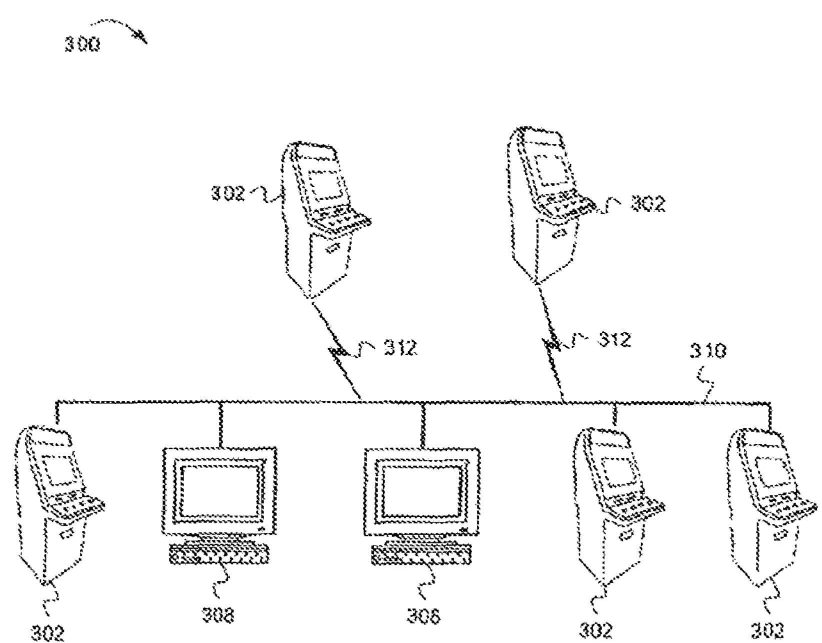
FIG. 3 is a block diagram illustrating a wagering game machine network, according to exemplary embodiments of the invention.

FIG. 3 is a block diagram of an exemplary wagering game network, in accordance with embodiments of the invention. As shown in FIG. 3, a wagering game network 300 includes a plurality of wagering game machines 302 and a plurality of cluster controllers 308. These components of the wagering game network 300 can communicate over wired connections 310 and/or wireless connections 312. The wagering game machines 302 can be connected to the wagering game network 300 using any suitable connection technology, such as Bluetooth, 802.11x, Ethernet, etc.

The cluster controllers 308 can be used for monitoring the wagering game machines 302 or controlling game machine related systems, such as wide-area progressive games, player tracking systems, and casino messaging systems. In some embodiments, the wagering game machines 302 can be part of a wide-area progressive game. In certain embodiments, the cluster controller 308 can accumulate and distribute progressive jackpots, while the wagering game machines 302 can determine whether players have won the progressive jackpots. Because progressive jackpots steadily increase as more wagers are placed, displaying progressive jackpots can attract players to the wagering game machines 302. According to embodiments, the wagering game machines 302 can receive updated jackpot amounts from the cluster controller 308 and present the jackpot amounts on display devices, as described below.

In some embodiments, the gaming network 300 includes a player tracking system. Player tracking systems typically obtain information about player demographics and playing habits. Player tracking systems typically use player tracking devices (not shown) to assist in acquiring the player information. The player tracking devices can be magnetic cards, flash memory devices, smart cards, or any portable device suitable for storing player information. At the beginning of a gaming session, players typically provide player information by inserting player tracking devices into the wagering game machines 302. The player tracking device may provide a player's name, age, gender, address, zip code, account number, etc. During the gaming session, the cluster controller 308 may record the time of day, duration of play, wager amounts, number of games played, and other information about a player's playing habits. Casinos can use the player tracking information to reward players and for marketing goods and services to specific players.

Player tracking systems typically present text messages on auxiliary video displays 230, which are added to the wagering game machines 302. The auxiliary displays can be 20 character scrolling text displays or miniature liquid crystal displays. The text messages can include product promotions and other marking content.

The player tracking systems can also work with casino messaging systems to facilitate delivery of text messages to players at the wagering game machines 302. In particular, casino messaging systems can be used for presenting "harm minimization" or "responsible gaming" messages. Such messages may suggest player rest periods or notify players about amounts wagered or lost. In some gaming jurisdictions, authorities require casino messaging systems to present responsible gaming messages. Casino messaging systems can also present emergency safety messages.

Embodiments of the invention expand the usefulness of player tracking and casino messaging systems. Among other things, certain embodiments allow player tracking and casino messaging systems to present multimedia messages, instead of scrolling text messages. Additionally, instead of being limited to small "add-on" displays (e.g., 20 character displays, miniature LCDs, etc.), embodiments allow player tracking and casino messaging systems to present the multimedia messages on the wagering game machines' primary displays, secondary displays, and/or audio presentation units. Furthermore, embodiments allow wagering game machines to present the responsible gaming messages without any further modification or inspection by gaming authorities.

While the discussion above presented exemplary hardware and an exemplary operating environment, the discussion below presents an exemplary system architecture, according to embodiments of the invention.

Exemplary System Architecture

Figure 4:
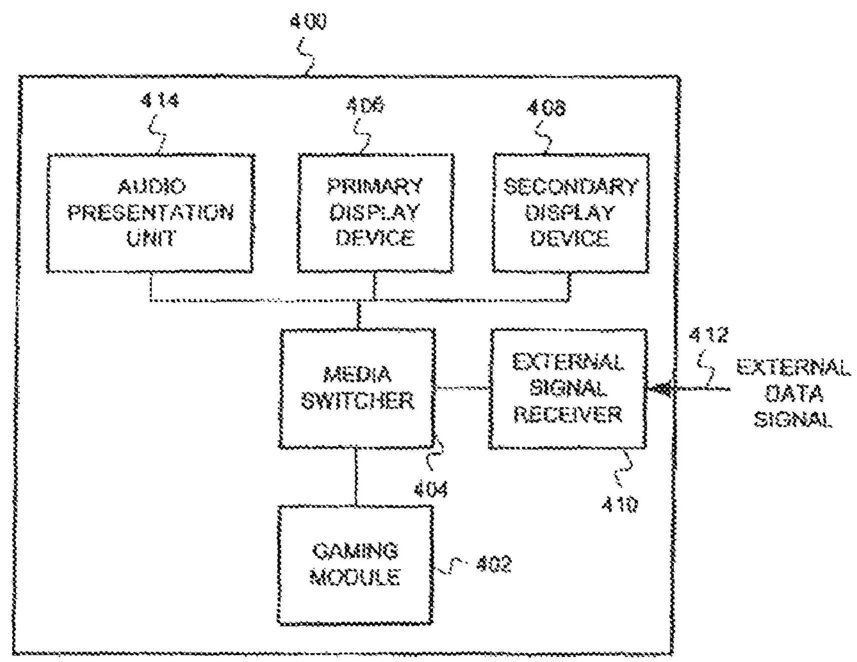
FIG. 4 is a block diagram illustrating a wagering game machine including a media switcher, according to exemplary embodiments of the invention.

FIG. 4 is a block diagram illustrating a wagering game machine including a media switcher, according to exemplary embodiments of the invention. As shown in FIG. 4, the wagering game machine 400 includes a gaming module 402 connected to a media switcher 404. The media switcher 404 is connected to an external signal receiver 410, audio presentation unit 414, primary display unit 406, and secondary display unit 408.

The audio presentation unit 414 can include audio speakers and any suitable components for processing and/or presenting audio signals.

The primary and secondary display devices 406 and 408 can be any display devices for visually conveying information to game players. For example, the primary and secondary display devices 406 and 408 can be cathode ray tube (CRT) displays, plasma displays, liquid crystal displays (LCD), digital micromirror device (DMD or DLP) displays, reels, or any other types of displays. The primary and secondary display devices 406 and 408 present images, which can include computer-generated graphics, prerecorded video images, and any other suitable media content.

The gaming module 402 can conduct wagering games, such as slots, video poker, or any other suitable wagering game. In one embodiment, the gaming module can include a processor and other hardware for conducting a wagering game. In another embodiment, the gaming module 402 can be software and/or firmware running on a processor (not shown). In addition to performing tasks related to wagering games, the processor can perform tasks for wide-area progressive jackpot systems, player tracking systems, player messaging systems, etc.

The external signal receiver 410 can receive an external data signal 412 from a source external to the wagering game machine 400. The external signal receiver 410 transmits the external data signal 412 to the media switcher 404. The external data signal 412 can include information received from various casino systems (e.g., wide-area progressive jackpot systems, player tracking systems, and casino messaging systems).

In one embodiment, the external data signal 412 can include media content and/or control data. Media content can include presentable audio and/or video content, while control data can specify operations to be performed by the gaming module 402, media switcher 404, or other component of the wagering game machine 400. In one embodiment, control data of the external data signal 412 instructs the media switcher 404 to present predetermined media stored on a gaming machine 400. In one embodiment, the external data signal 412 can instruct the gaming module 402 to present a random award to a player.

The media switcher 404 transmits media signals to the audio presentation unit 414, primary display device 406, and secondary display device 408. In some embodiments, the media switcher 404 is controlled by the gaming module 402, while in other embodiments the media switcher 404 can be controlled by externally provided signals (e.g., control data in the external data signal 412) or presets. The media switcher 404 can process any suitable media signals and transmission formations. For example, the media signals and transmission formations can include NTSC RF signals, Firewire or IEEE 1394 video, composite, component (YUV or YprPb), DVI (including DVI-HDMI and HDCP), serial digital interface (SDI), and s-video.

According to some embodiments, the components of the wagering game machine 400 can include machine readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.). According to embodiments of the invention, the wagering game machine 400 can include other types of logic (e.g., digital logic) for executing the operations described herein.

System Operations

This section describes operations performed by embodiments of the invention. In certain embodiments, the operations are performed by instructions included on machine-readable media (e.g., software), while in other embodiments, the methods are performed by hardware, firmware, or other logic (e.g., digital logic). In this section, FIGS. 5-7 will be discussed. In particular, FIG. 5 describes operations for conducting a wagering game and transmitting wagering game media to a media switcher, while FIG. 6 describes operations for presenting media using a media switcher. FIG. 7 shows an exemplary media presentation, according to embodiment of the invention.

Figure 5:
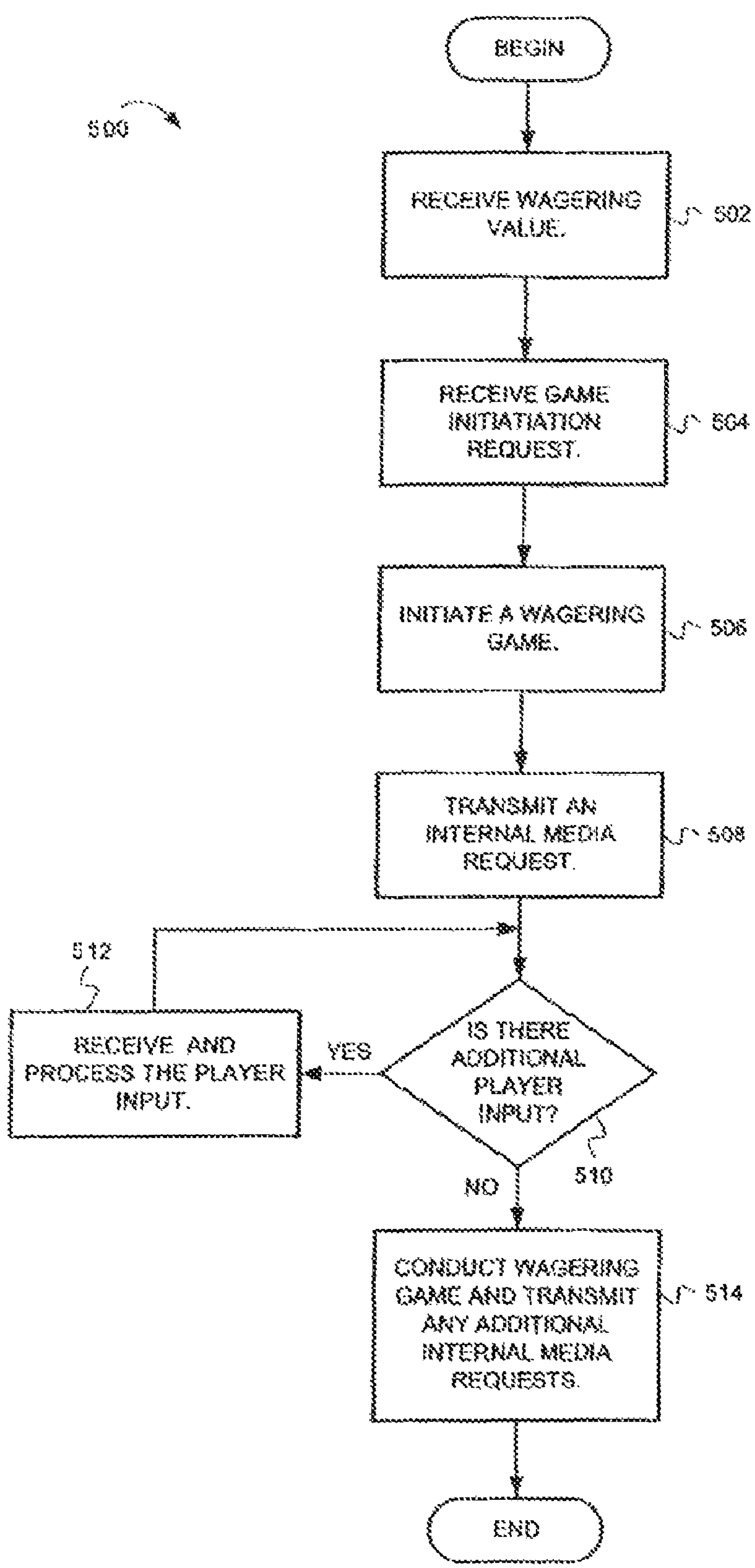
FIG. 5 is a flow diagram illustrating operations for conducting a wagering game and transmitting wagering game media to a media switcher, according to exemplary embodiments of the invention.

FIG. 5 is a flow diagram illustrating operations for conducting a wagering game and transmitting wagering game media to a media switcher, according to exemplary embodiments of the invention. The flow diagram 500 will be described with reference to the exemplary system shown in FIG. 4. The flow diagram 500 commences at block 502.

At block 502, wagering value is received. For example, the wagering game machine 400 receives monetary value through a coin slot or bill acceptor (see FIG. 2). The gaming module 402 receives notice that the wagering value has been received. The flow continues at block 504.

At block 504, a game initiation request is received. For example, a player activates a "play" button and the gaming module 402 receives a game initiation request. The flow continues at block 506.

At block 506, a wagering game is initiated. For example, the gaming module 402 initiates a wagering game, such as slots, video poker, etc. The flow continues at block 508.

At block 508, an internal media request is transmitted. For example, in order to present an initial media sequence, the gaming module 402 transmits an internal media request to the media switcher 404. In one embodiment, an internal media request originates from a component inside the wagering game machine 400. Internal media requests can include or be associated with media content related to a wagering game (e.g., media content representing spinning reels of a video slots game). According to embodiments, the internal media request can include prerecorded audio and video content, animation content, or other suitable media content. The flow continues at block 510.

At block 510, a determination is made about whether there is additional player input. For example, the gaming module 402 determines whether the wagering game requires additional player input. If no additional player input will be received, the flow continues at block 514. Otherwise, the flow continues at block 512.

At block 512, additional player input is received and processed. For example, the gaming module 402 receives additional player input via the wagering game machine's player input buttons (see FIG. 2). The flow continues at block 510.

At block 514, the wagering game is conducted and any additional internal media requests are transmitted. For example, the gaming module 402 conducts the wagering game. The gaming module 402 also transmits any additional internal media requests to the media switcher 404. From block 514, the flow ends.

Figure 6:
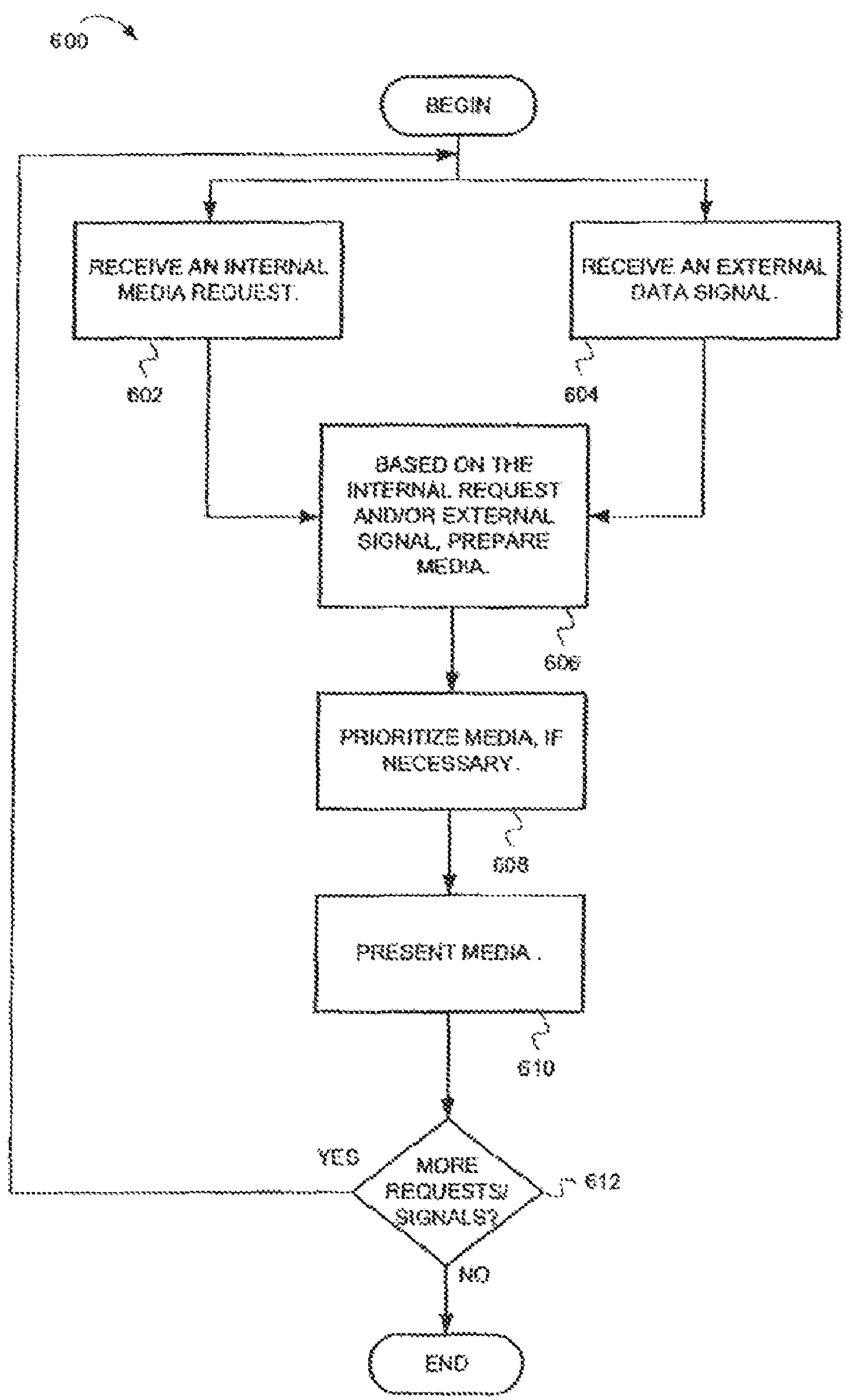
FIG. 6 is a flow diagram illustrating operations for presenting media using a media switcher, according to exemplary embodiments of the invention.
Figure 7:
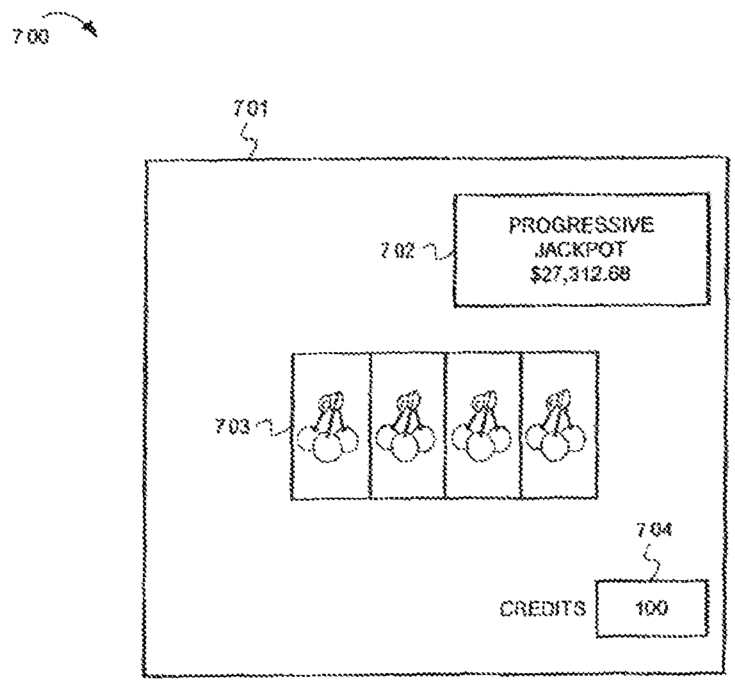
FIG. 7 is a block diagram illustrating a presentation of internally and externally derived media content, according to exemplary embodiments of the invention.

While FIG. 5 describes operations for transmitting wagering game media to a media switcher, FIG. 6 describes presenting media using a media switcher.

FIG. 6 is a flow diagram illustrating operations for presenting media using a media switcher, according to exemplary embodiments of the invention. The flow diagram 600 will be described with reference to the exemplary system shown in FIG. 4. The flow diagram 600 commences at blocks 602 and 604. According to embodiments, the operations at blocks 602 and 604 may be performed in parallel.

At block 602, an internal media request is received. For example, media switcher 404 receives an internal media request from the gaming module 402. The flow continues at block 606.

At block 604, an external data signal is received. For example, the media switcher 404 receives an external data signal from the external data signal receiver 410. In one embodiment, the external data signal receiver 410 received the external data signal 412 from a source external to the wagering game machine 400. The flow continues at block 606.

At block 606, media content is prepared based on the internal request and/or the external signal. For example, the media switcher 404 prepares media content received as part of the request/signal. The media preparation can include fetching locally stored media content that is selected by the request/signal. The media preparation can also include processing media content included in the request/signal. Processing media content can also include converting or transcoding video signals within the video switcher 404 or within another component of the wagering game machine 400. Because some embodiments of the video switcher 404 can process video signals of varying formats, converting or transcoding one signal format to another may include conversion between color spaces, conversion between analog and digital, scaling, resampling, or deinterlacing some video signals. The flow continues at block 608.

At block 608, the media content is prioritized, if necessary. For example, the media switcher 404 determines an order in which it will present the media content. In one embodiment, the media switcher 404 can delay media content derived from the external data signal to avoid interrupting media content related to the wagering game. Additionally, the media switcher 404 can delay internally requested media content based on higher priority external media content. As part of prioritizing the media content, the media switcher 404 can interleave content from the external signal with internal content. The flow continues at block 610.

At block 610, the media content is presented. For example, the media switcher 404 presents the media content on the audio presentation unit 414, primary display device 406, and/or secondary display device 408. FIG. 7 helps to illustrate how the media switcher 404 can present media content on a wagering game machine.

FIG. 7 is a block diagram illustrating a presentation of internally and externally requested media content, according to exemplary embodiments of the invention. As shown in FIG. 7, the media switcher 404 can simultaneously present both internally and externally requested media content. In particular, the media switcher 404 can present video reels 703 and a credit indicator 704, which constitute internally requested media content (e.g., content that is based on operations performed by the gaming module 402). At the same time, the media switcher 404 can present a progressive jackpot amount 702, which constitutes externally requested media content (e.g., content based on the external data signal 412).

In the embodiment shown in FIG. 7, the media switcher 404 presents the internally and externally derived media content in a picture-in-picture format. Other embodiments call for other suitable formats, such as cascaded images, tiled images, etc. The media switcher 404 can also present audio content along with the video content. For example, the media switcher 404 can present prerecorded or streaming audio contemporaneously with the picture-in-picture video described above.

Referring back to the discussion of FIG. 6, when the media switcher 404 presents media, it may switch between presenting media based on the external data signal 412 and internally derived media. In one embodiment, the switching between media results from the prioritization performed at block 608. The flow continues at block 612.

At block 612, a determination is made about whether there are more requests/signals. For example, the media switcher 404 determines whether there are additional requests/signals to process. If there are additional requests/signals, the flow continues at blocks 602 and 604. Otherwise, the flow ends.

Exemplary Implementation

In this section, exemplary implementation details of some embodiments will be described. While this section describes some exemplary implementation details, it is not an exhaustive list. In this section, FIGS. 8 and 9 describe implementations configured for receiving an external data signal from a cluster controller.

Figure 8:
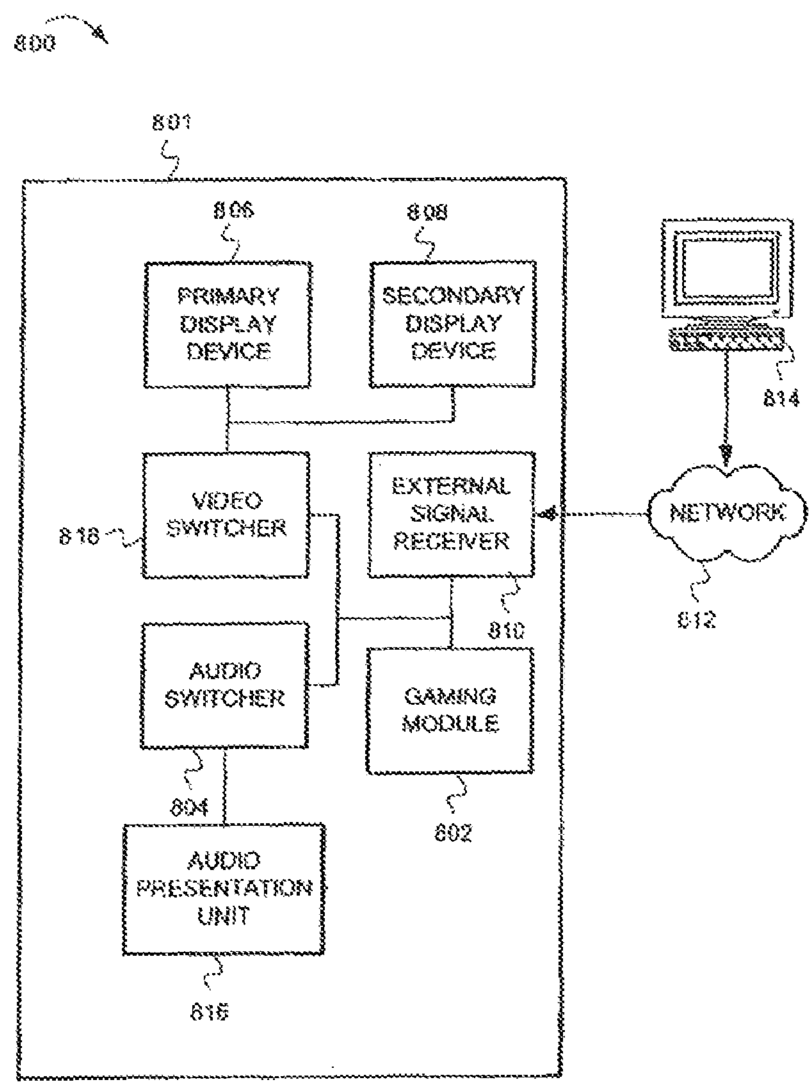
FIG. 8 is a block diagram illustrating a wagering game machine configured for receiving external data signals from a cluster controller, according to exemplary embodiments of the invention.

FIG. 8 is a block diagram illustrating a wagering game machine configured for receiving external data signals from a cluster controller, according to exemplary embodiments of the invention. As shown in FIG. 8, the wagering game machine 801 includes a gaming module 802, which is connected to an external signal receiver 810. The external signal receiver 810 is connected to an external communication network 812. The network 812 is connected to a cluster controller 814. As described above in the discussion of FIG. 1, the cluster controller can be part of the wide-area progressive system, player tracking system, casino messaging system, and/or other system designed to work with the wagering game machine 801.

In the implementation shown in FIG. 8, instead employing a single media switcher, the wagering game machine 801 includes a video switcher 818 and an audio switcher 804. The video switcher 818 and audio switcher 804 are connected to the gaming module 802. The audio switcher 804 is connected to an audio presentation unit 816, while the video switcher 818 is connected to a primary display device 806 and a secondary display device 808. In one embodiment, the video switcher 818 can be a TVone Universal Video Scaler Model C2-775.

According to embodiments, the wagering game machine 801 can perform operations similar to those described in FIGS. 5 and 6. The gaming module 802 transmits audio content requests to the audio switcher 804 and video content requests to the video switcher 818. The audio switcher 804 presents audio content on the audio presentation unit 816, whereas the video switcher 818 presents video content on the primary and secondary display units 806 and 808.

Figure 9:
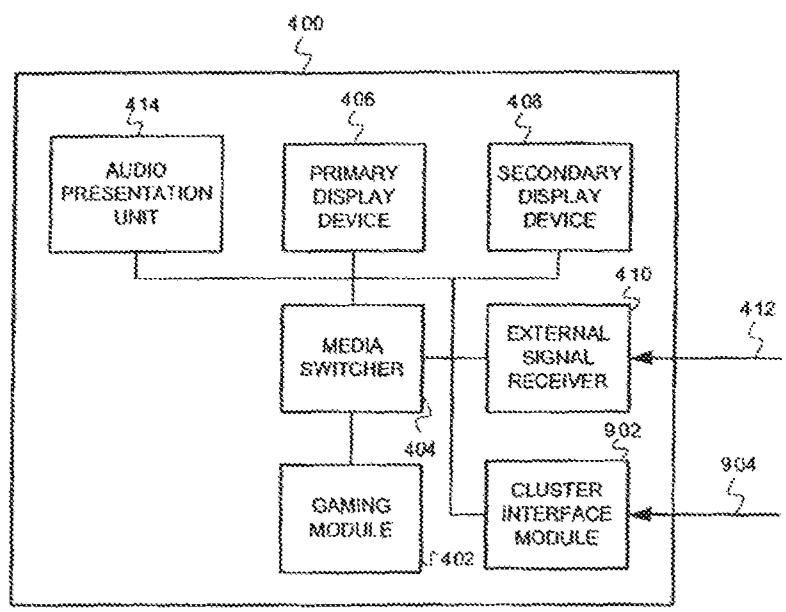
FIG. 9 is a block diagram illustrating a wagering game machine including a cluster interface module for receiving external data signals, according to exemplary embodiments of the invention.

FIG. 9 is a block diagram illustrating a wagering game machine including a cluster interface module for receiving external data signals, according to exemplary embodiments of the invention. In FIG. 9, the wagering game machine 400 of FIG. 4 includes one additional component. In particular, the wagering game machine 400 is adapted to include a cluster interface module 902 connected to the media switcher 404, primary display device 406 and secondary display device 408. The cluster interface module 902 can receive a cluster controller signal 904. The cluster controller signal can include media content and/or control signals. The control signals can include commands directing the media switcher 404 to present media stored on the gaming machine 400. The operations of the gaming machine shown in FIG. 9 are similar to those shown in FIGS. 5 and 6.

In one embodiment, the primary display device 406 and/or secondary display device 408 are touch screen input devices. In one embodiment, the cluster interface module 902 can snoop input received on the touch screens and determine whether the input is intended for player tacking or casino messaging systems. If the input is intended for the player tracking, casino messaging systems, or other system, the cluster interface forwards the input to the appropriate system. As a result, the wagering game machine 400 can provide two-way communications between itself and external systems. Moreover, the wagering game machine can provide the two-way communications without any additional input/output devices.

In another exemplary embodiment, a computerized wagering game system has a gaming module comprising a processor and gaming code which is operable when executed on the processor to conduct a wagering game on which monetary value can be wagered, and a display coupled to the gaming module via a video switcher and operable to display information related to the wagering game. The video switcher is operable to receive an external video signal from a video source external to the wagering game system, and is further operable to control presentation of the external video signal and the wagering game information on the display.

Figure 10:
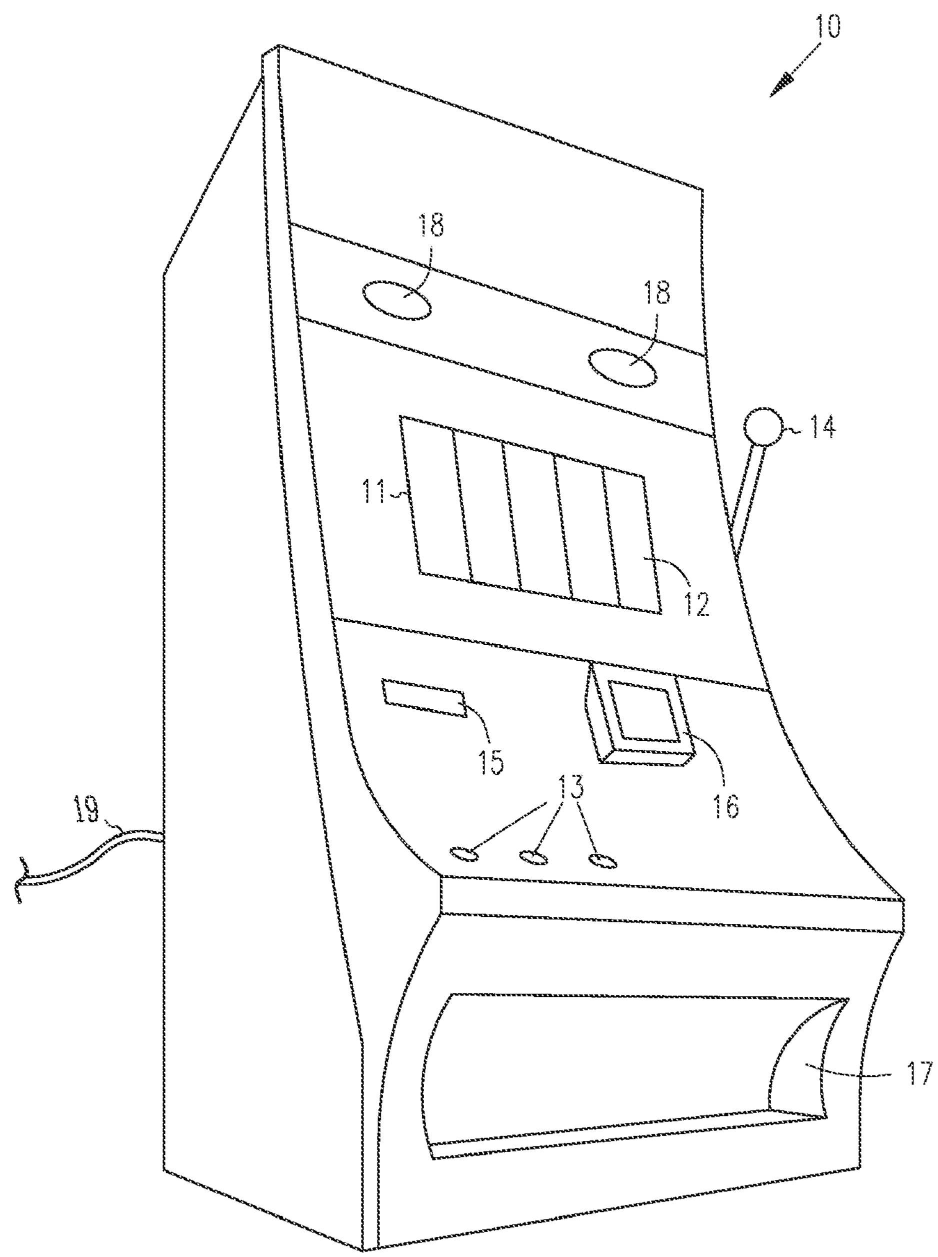
FIG. 10 shows a computerized reel slot gaming system having a video switch, consistent with an example embodiment of the present invention.

FIG. 10 illustrates a computerized wagering game machine, as may be used in an embodiment of the invention described herein. The computerized gaming system shown generally at 10 is a video gaming system, which displays information for at least one wagering game upon which monetary value can be wagered on video display 11. Alternate embodiments of the invention will have other game indicators, such as mechanical reels instead of the video graphics reels 12. The game of chance is played and controlled with various buttons 13, and in some embodiments also with a pull arm 14 to initiate reel spin. Value is wagered on the games, such as with tokens, coins, bills, or cards that hold value. The wagered value is conveyed to the machine through a changer 15 or a secure user identification module interface 16, and winnings are returned via the returned value card or through the coin tray 17. Sound is also provided through speakers 18, and video from an external video source is provided via external video interface 19.

Figure 11:
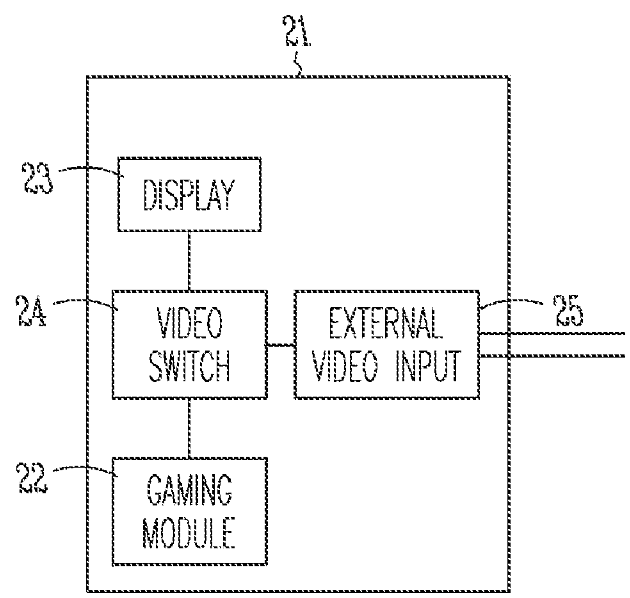
FIG. 11 is a block diagram of a computerized wagering game having a video switch, consistent with an example embodiment of the present invention.

FIG. 11 illustrates an example embodiment of a wagering game employing a video switcher, consistent with an example embodiment of the present invention. The computerized wagering game machine 21 includes a gaming module 22 that conducts a wagering game. In various embodiments, the wagering game is a reel slot machine, video poker, or another wagering game upon which a game player can wager monetary value. The gaming module receives input through user interfaces such as buttons 13 and pull arm 14, which are used to conduct game play. The current state of the game and other game-related information is conveyed to the game player via a display 23.

The display is in various embodiments of the invention any type of display operable to visually convey information to the game player, including a cathode ray tube or CRT display, a plasma display, a liquid crystal display (LCD), a digital micromirror device (DMD or DLP) display, or any other type of display. The display receives a video signal from the gaming module via video switch 24, and visually displays the video data contained in the video signal. The video signal in various embodiments comprises information including computer-generated graphics, prerecorded video images, and other such visual information.

Video switch 24 is also connected to an external video input 25, which is operable to receive a video signal from a source external to the computerized wagering game 21. The video switch 24 is operable to control presentation of both the video signal received through the external video switch 24 and the gaming module 22. In some embodiments, the video switch is operated under control of the gaming module 22, while in other embodiments the video switch is controlled by another element such as an externally provided signal or presets.

One example of such a system is a cluster of progressive slot machines in which the manufacturers vary or which contains gaming machines not manufactured by the company assembling the progressive slot cluster. The video switch is installed in the wagering game such that the external video input signal is displayed along with the video signal provided from the gaming module, but the functionality to control or configure the video switch will not be built in to the gaming module. The video switch therefore displays the information received via the external video input in either a window, such as via a picture-in picture presentation, or alternating with the video signal from the gaming module.

Figure 12:
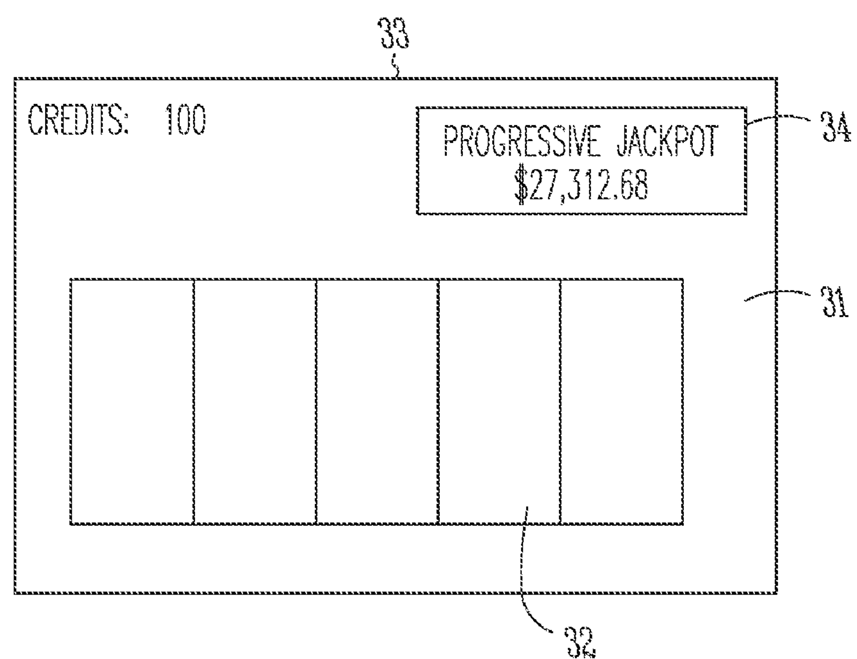
FIG. 12 shows an progressive slot machine game display utilizing the video switch to display both gaming module video information and information from the external video input, consistent with an example embodiment of the present invention.

FIG. 12 shows an example of a progressive slot machine game utilizing the video switch to display both gaming module video information and information from the external video input. The video display screen 31 corresponds to the video display 11 of FIG. 10, and is used to present information related to the wagering game. Five slot reels are shown at 32, and spin in response to a game player's initiation of a reel spin while playing the slot machine wagering game. The number of credits or dollar value the game player has accumulated are shown at 33, and change in response to wagers placed and games played that are won. Both the slot reels 32 and the credits or monetary value indicator 33 are generated by the computerized wagering game system, and are displayed via the video switch 24 from a signal generated within the gaming module 22.

A progressive jackpot indicator is shown at 34, and is presented in a window in the video display. The progressive jackpot indicator window is also known as picture-in-picture, as one image is presented within another image. The progressive jackpot indicator in this example reflects accumulated deposits wagered from multiple slot machines grouped together in a progressive jackpot cluster, so that a relatively large jackpot may accumulate and add to interest in playing the progressive games. Typically, the payback percentage remains similar to that of traditional slot machines, so the larger the number of active slot machine wagering games in the progressive jackpot group the more quickly the progressive jackpot will grow. Pooling large numbers of progressive slot machines also requires each machine to make a smaller contribution to the progressive jackpot to reach a certain level, so payout for other jackpots and winning reel combinations can be set higher.

Because it is beneficial to pool a relatively large number of slot machine wagering games together in a progressive pool, casino owners and wagering game manufacturers typically try to assemble enough machines to ensure that everyone who wants to play for a progressive jackpot during peak hours is able to find a wagering game machine to play. This sometimes involves use of multiple types of slot machines, or even of multiple brands of slot machines from different manufacturers. In such cases, the ability to receive a progressive jackpot from a central progressive slot machine controller may not be built in to the slot machine wagering game.

The example embodiment of FIG. 12 addresses this problem by receiving the picture-in-picture progressive jackpot data shown at 34 from an external video source, through an external video input such as 25 of FIG. 11. The video switch 24 receives both the traditional signal from the gaming module including the slot reels and the credits or monetary value counter, and the external video signal from the progressive cluster game controller, and formats the two signals as shown in FIG. 12.

Other embodiments of the invention include the ability to control the video switch from the gaming module 22 or from a remote system such as a progressive slot cluster controller, and will be operable to vary which signal is shown on the display or how the video signals are combined for display. Further embodiments of the invention utilize two displays, such as a primary display and a game top-box, such that the video switch controls presentation of supplemental wagering game information from the gaming module and external video via the video switch for presentation on the top-box or second display.

The inputs and outputs of the video switch will vary in different embodiments of the invention to include any suitable image, graphic, or video format, and any appropriate means for transmission. It is further anticipated that the video formats handled by the switcher, displayed by the display device, and generated by the gaming module or external video input may not be the same in many environments, and will require conversion or transcoding within the video switch or within another device between generation and display. Examples of suitable video signals and transmission formats include NTSC RF signals, Firewire or IEEE 1394 video, composite, component (YUV or YprPb), DVI (including DVI-HDMI and HDCP), SDI or serial digital interface, and s-video. Because some embodiments of the invention will handle video signals of varying formats, conversion or transcoding one signal format to another will also include conversion between color spaces, conversion between analog and digital, and scaling, resampling, or deinterlacing some video signals.

The example embodiments of the invention described above show how a video switch employed in a computerized wagering game machine can be used to selectively display data from the wagering game machine and from an external video source. However, sometimes sending a video signal to each machine will not be the preferred method of distributing video or graphic data to wagering game machines.

Figure 13:
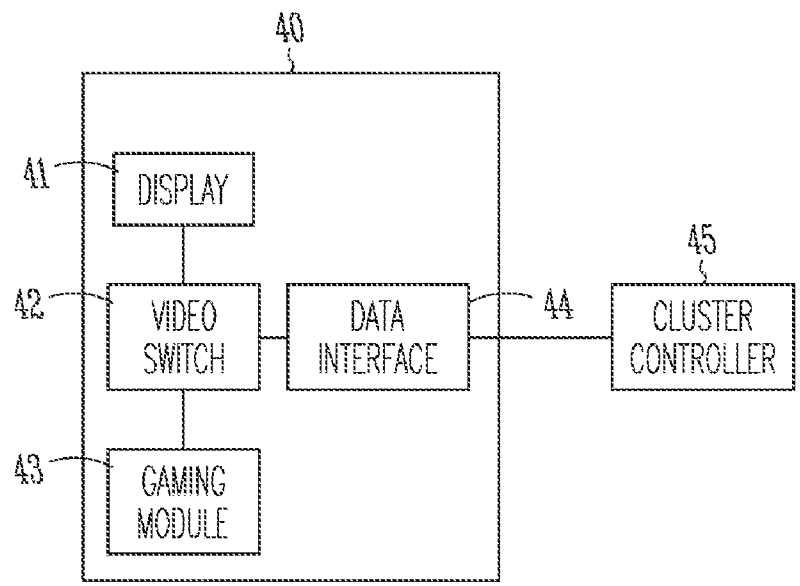
FIG. 13 illustrates an example embodiment of a computerized wagering game machine having a video switch coupled to a data interface and operable to selectively display video from one or more inputs, consistent with an example embodiment of the present invention.

FIG. 13 illustrates an example embodiment of a computerized wagering game machine 40 having a display 41, a video switch 42, and a gaming module 43. These elements function as before, so that the gaming module 43 generates a video signal that is routed through the video switch 42 to the display 41. The video switch is still operable to selectively display video from one or more inputs on the display. In this example embodiment, the video switch is also coupled to a data interface 44, which is operable to receive data over a link to a cluster controller 45 or other such remote data source. The data is then rendered as a video signal in the data interface 44, and is provided as a video signal to video switch 42. The video switch can therefore operate in the same way as the video switch of FIG. 12, including displaying either one video signal or the other, or displaying them at the same time via picture-in-picture, split screen, or another video configuration.

Extending the progressive slot example presented earlier to the apparatus of FIG. 13, the cluster controller 45 controls coordination of the progressive slot game among a cluster of slot machine wagering game systems. The cluster controller sends a digital signal via a link to the data interface of one or more computerized wagering game systems 40, and the data interface 44 receives the digital signal and converts it to a video or graphic representation of the data contained therein. For example, the progressive slot jackpot total is sent as a digital representation of the dollar value of the jackpot to the data interface, which in response renders the received value data as a dollar sign and numbers suitable for display on the display device 41. The video switch 42 is then responsive to control signals from either the gaming module 43 or from the cluster controller 45, to selectively display the graphically rendered jackpot amount as video on display 41.

Figure 14:
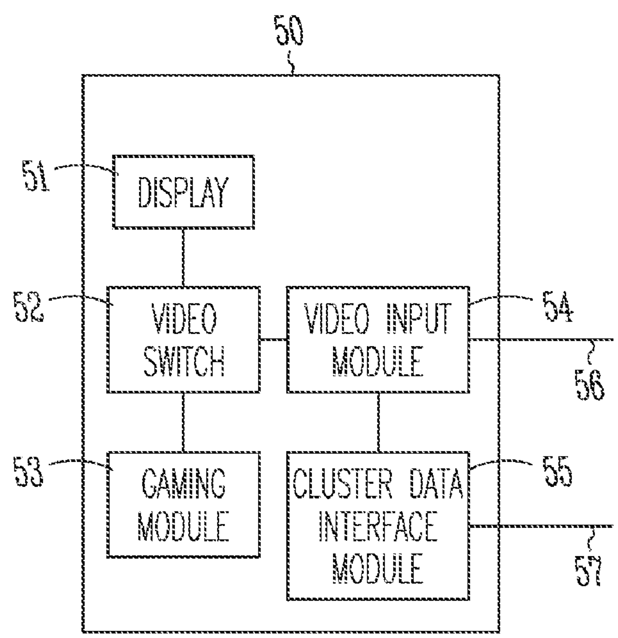
FIG. 14 illustrates an example embodiment of a computerized wagering game machine having a video switch coupled to a video input module and operable to selectively display video from one or more sources, consistent with an example embodiment of the present invention.

FIG. 14 is a further example of a computerized wagering game having a data interface and a video switch, further comprising a separate video input module. Display 51, video switch 52, and gaming module 53 function as before, while a video input module 54 receives one or more video signals and selectively routes them to the video switch 52. The video input module is coupled to an external video link 56, over which the video input module is operable to receive a video or graphic signal. The video input module is also coupled to a cluster data interface module 55, which is in turn operable to receive data from an external data source such as a cluster controller via data link 57. In some embodiments, the video input module is operable to selectively route video signals to the video switch, while in other embodiments it forwards each received signal to the switch as a separate video signal. The video input module will in some embodiments also do transcoding to convert video signals from one format to another, and will output a video format specific to the video switch's inputs.

The cluster data interface module 55 operates as the data interface 44 of FIG. 14, in that it is operable to receive a data signal and render received data as video or graphics. This rendered video signal is then routed through the video input module as is shown in FIG. 14, or in alternate embodiments is coupled directly to the video switch 52. In still further embodiments, the video switch is coupled to one or more additional displays, and is operable to control which incoming video signals are routed to which displays.

These configurations allow a greater amount of flexibility in receiving data and in displaying data on one or more displays in the computerized wagering game system. Consider as a more complex example a system with a main display and a second display in a set top box. A progressive slot machine operates in coordination with a cluster controller, and the game is displayed on the main display along with a progressive jackpot dollar amount provided as a data signal via a data interface to the cluster controller. The cluster controller data interface converts the data signal to a video signal, which is inserted into a picture-in-picture view of the wagering game via the video switch. A video input module also receives video comprising promotional material relating to other activities at the wagering game facility, which is routed via the video switch to the second monitor on the set top box when the set top box display is not being used to display information important to the wagering game.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

These examples illustrate how a computerized wagering game with a video switch can function to display both video information from a wagering game as well as to display information provided via an external interface. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method for presenting media in a wagering game machine comprising:

receiving an internal media request to select a first media content, the internal media request originating from a gaming module within the wagering game machine;

receiving an external data signal from outside the wagering game machine via a wagering game network, the external data signal associated with an external media request to select a second media content;

determining a priority of the internal media request to select the first media content and a priority of the external media request to select the second media content;

preparing media including one or both of the first media content and the second media content based on the internal media request, the external media request, and the priority of the internal media request and the priority of the external media request; and presenting the media on one or more media presentation devices.

2. The method of claim 1, further comprising:

receiving player input through an input device;

determining whether the player input is for an external system; and if the player input is for an external system, transmitting the input to the external system.

3. The method of claim 1, wherein the priority of the internal media request is based on events of a wagering game conducted by the wagering game machine.

4. The method of claim 1, wherein the external data signal includes an instruction to present predetermined media stored on the wagering game machine.

5. The method of claim 1, wherein the external data signal includes media content.

6. The method of claim 1, wherein the external data signal is received from a wide-area progressive game system, a player tracking system, or a casino messaging system.

7. The method of claim 1, wherein the media includes audio content or video content.

8. A wagering game machine comprising:

one or more processors;

one or more media presentation devices; and a gaming module executable by the one or more processors and configured to conduct a wagering game on which monetary value can be wagered;

wherein the one or more processors are further configured to:

receive an internal media request to select a first media content, the internal media request originating from the gaming module;

receive an external data signal from outside the wagering game machine via a wagering game network, the external data signal associated with an external media request to select a second media content;

determine a priority of the internal media request to select the first media content and a priority of the external media request to select the second media content;

prepare media including one or both of the first media content and the second media content based on the internal media request, the external media request, and the priority of the internal media request and the priority of the external media request; and present the media on the one or more media presentation devices.

9. The wagering game machine of claim 8, further comprising an input device to receive player input and wherein the one or more processors are configured to:

determine whether the player input is for an external system; and upon determining that the player input is for an external system, transmit the input to the external system.

10. The wagering game machine of claim 8, wherein the one or more processors determine the priority of the internal media request based on events of the wagering game conducted by the wagering game machine.

11. The wagering game machine of claim 8, wherein the external data signal includes an instruction to present predetermined media stored on the wagering game machine.

12. The wagering game machine of claim 8, wherein the external data signal includes media content.

13. The wagering game machine of claim 8, wherein the external data signal is received from a wide-area progressive game system, a player tracking system, or a casino messaging system.

14. The wagering game machine of claim 8, wherein the media includes audio content or video content.

15. A non-transitory machine-readable storage medium having stored thereon instructions that when executed by one or more processors cause the one or more processors to execute operations comprising:

receiving an internal media request to select a first media content, the internal media request originating from a gaming module within the wagering game machine;

receiving an external data signal from outside the wagering game machine via a wagering game network, the external data signal associated with an external media request to select a second media content;

determining a priority of the internal media request to select the first media content and a priority of the external media request to select the second media content;

preparing media including one or both of the first media content and the second media content based on the internal media request, the external media request, and the priority of the internal media request and the priority of the external media request; and presenting the media on one or more media presentation devices.

16. The non-transitory machine-readable storage medium of claim 15, wherein the operations further comprise:

receiving player input through an input device;

determining whether the player input is for an external system; and if the player input is for an external system, transmitting the input to the external system.

17. The non-transitory machine-readable storage medium of claim 15, wherein the priority of the internal media request is based on events of the wagering game conducted by the wagering game machine.

* * * * *